(12) United States Patent
Winfield Mote (10) Patent No.: US 12,288,108 B2
(45) Date of Patent: Apr. 29, 2025

(54) DATA LOADING AND MANAGEMENT

(71) Applicant: Twilio Inc., San Francisco, CA (US)

(72) Inventor: Tyson Winfield Mote, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/195,773

(22) Filed: May 10, 2023

(65) Prior Publication Data

US 2024/0134882 A1 Apr. 25, 2024
US 2024/0231968 A9 Jul. 11, 2024

Related U.S. Application Data

(60) Provisional application No. 63/418,373, filed on Oct. 21, 2022.

(51) Int. Cl.
| | |
|---|---|
| *G06F 16/00* | (2019.01) |
| *G06F 9/54* | (2006.01) |
| *G06F 11/07* | (2006.01) |
| *G06F 11/14* | (2006.01) |
| *G06F 16/23* | (2019.01) |
| *G06F 16/25* | (2019.01) |
| *G06F 16/27* | (2019.01) |

(52) U.S. Cl.
CPC .......... *G06F 9/546* (2013.01); *G06F 11/0745* (2013.01); *G06F 11/1474* (2013.01); *G06F 16/2358* (2019.01); *G06F 16/258* (2019.01); *G06F 16/278* (2019.01)

(58) Field of Classification Search
CPC .. G06F 9/546; G06F 11/0745; G06F 16/2358; G06F 16/258; G06F 16/278
See application file for complete search history.

(56) References Cited

U.S. PATENT DOCUMENTS

| | | | |
|---|---|---|---|
| 2003/0061225 A1* | 3/2003 | Bowman | G06F 16/10 |
| 2022/0229841 A1* | 7/2022 | Kharidehal | G06Q 10/0633 |
| 2023/0153287 A1* | 5/2023 | Stephens | G06F 3/0608 |
| | | | 707/737 |
| 2024/0160507 A1 | 5/2024 | Mote | |

OTHER PUBLICATIONS

"U.S. Appl. No. 18/195,798, Examiner Interview Summary mailed Oct. 25, 2024", 2 pgs.
"U.S. Appl. No. 18/195,798, Examiner Interview Summary mailed Nov. 27, 2024", 2 pgs.

* cited by examiner

*Primary Examiner* — Paul Kim
(74) *Attorney, Agent, or Firm* — Schwegman Lundberg & Woessner, P.A.

(57) ABSTRACT

Various embodiments include systems, methods, and non-transitory computer-readable media for managing data. Consistent with these embodiments, a method includes identifying a data record from a database; converting the data record into a data object; partitioning the data object into a plurality of files; generating a plurality of events based on the plurality of files; and causing the plurality of events to be transmitted to a destination.

18 Claims, 7 Drawing Sheets

DATA LOADING AND MANAGEMENT

TECHNICAL FIELD

The present disclosure generally relates to data management, and, more particularly, various embodiments described herein provide for systems, methods, techniques, instruction sequences, and/or devices that facilitate efficient data loading in preparation for delivery to various destinations.

BACKGROUND

High throughput systems face challenges when it comes to efficiently loading data extracted from various data sources. Inefficient data access and loading can cause various issues, including system latency in data processing and/or unnecessary consumption of computing resources.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

"Data warehouse" refers to a database that contains data that can be exploited using various tools.

"Data model" refers to a query (e.g., a user-written SQL query) that defines data from a data warehouse that a user requests. An example user request includes requests to deliver data from the data warehouse to various destinations. A data model can run on a user-configured schedule and can be manually triggered.

"Sync" or "synchronization" refers to a data extracting and/or loading operation for a data model. It encompasses loading data from a data warehouse and delivering it to one or more configured destinations. A sync or synchronization is complete after all rows have been successfully delivered or have been determined to be permanently failed.

"Phase" refers to a step (e.g., extract or load) in a synchronization. A phase in a given sync can run in series or parallel.

Various examples include systems, methods, and non-transitory computer-readable media for data management that facilitate efficient data loading in preparation for delivery to various destinations. Specifically, a data management system identifies a data record (e.g., query results) from a database, such as object-based storage. The data management system converts the data record into a data object, such as JavaScript Object Notation (JSON) data object.

In various embodiments, the data management system partitions the data object into a plurality of files. Each file can correspond to a row in the data record. The data management system generates a plurality of events based on the plurality of files and causes the plurality of events to be transmitted (or delivered) to one or more destinations.

In various embodiments, after query results are stored in a database (e.g., object-based storage), the data management system is notified that the query results can be read and delivered to one or more destinations (e.g., configured actions). In various embodiments, query results can be read-only from the object-based storage. The data management system can receive and transmit data from a streaming pipeline.

In various embodiments, the data management system receives an action mapping via one or more user inputs. The data management system fetches one or more actions associated with the plurality of events. An action corresponds to a destination.

In various embodiments, the data management system generates a source/destination pair (also referred to as pair or destination pair) based on the action and the plurality of events and causes the plurality of events to be transmitted (or delivered) to a destination based on the pair.

In various embodiments, the data management system generates a load progress that indicates a delivery status of the plurality of events. The data management system can cause the load progress to be displayed on a device for visibility. A load progress can include a pending status, a successful status, or a failed status, depending on the stage of the event delivery. The load progress can also include a count of errors or warnings returned by a downstream Application Programming Interface (API).

In various embodiments, the data management system can identify metadata associated with the data record. The metadata can indicate if one or more changes have occurred to the data record. The data management system can create or update an event further based on the metadata associated with the data record.

In various embodiments, the data management system can also cause events to be transmitted to various destinations in parallel.

In various embodiments, an event can be delivered at least once. As a general principle, a data loading phase (also referred to as a load step or a load phase) is not considered successful until the data management system causes the successful delivery of the events. Events (also referred to as jobs) may be retried a number of times or a period of time upon failure. A watermark (or a checkpoint) can be generated and managed to help identify positions when a phase is interrupted.

In various embodiments, failed load steps (or operations) can be retried. For example, if a load step fails to create one or more necessary jobs, it can be retried. The count and interval between retries can be configured to balance reliability, latency, and cost efficiency.

In order to minimize duplicated data on retry, in various embodiments, load steps can maintain a watermark (or a checkpoint) that lets the data management system pick up where it left off after a crash, interrupt, and/or other step's restart. The watermark, or the checkpoint, can be updated periodically, such as at a configurable interval.

When generating events (also referred to as jobs) for delivering data (e.g., query results) to various destinations, the data management system can generate events based on a rate limit so that the delivering component is not overwhelmed. A rate limit (also referred to as a delivery rate or delivery frequency) can be determined via load testing and configured on a per-source basis.

In various embodiments, customers (or users) can configure one or more actions to receive data (e.g., query results) extracted from data warehouses. The data management system can fetch one or more configured actions associated with generated events and causes the generated events to be delivered to destinations based on the configured actions. An action configuration can be static throughout a lifecycle of a load step.

In various embodiments, an action configuration can be updated while the data management system generates events (e.g., a load step in flight). The updates may not affect the generation of the events. Under this approach, a snapshot of the action configuration may be persisted so that the data management system on retry can pick up where an interrupted operation left off with the same configuration.

In various embodiments, an input to an action can be a state (e.g., new, updated, deleted) and column values. Instead of traditional API-events payloads, the input to an action can be an object (e.g., a JSON object) containing the result state and fields:

```
{
    "state": "updated",
    "fields": {
        "id": "abc123",
        "first_name": "xy",
        "last_name": "z",
        "email": "xyz@def.com",
        // ...
    }
}
```

In various embodiments, an object (e.g., a JSON object or JSON structure) can include a plurality of fields. Each field can include a result state. Example result state and fields can be configured as below:

```
{
    "type": "track",
    "event": "new",
    "properties": {
        "id": "abc123",
        "first_name": "xy",
        "last_name": "z",
        "email": "xyz@def.com",
        // ...
    }
}
```

A user can configure an action mapping using a payload shape.

Failed Action executions can be retried according to a retry policy. These can include action executions that fail due to a non-permanent error. Requests can follow a retry policy (e.g., ~3-10 retries over 4 hours). A retry policy can be tested and configured to balance latency, deliverability, and efficiency.

Users can view the progress of a load phase. While a load phase is ongoing, users can view the load progress as the number of pending, successful, and/or failed deliveries as well as a count of errors and/or warnings (e.g., as non-2xx status codes) returned by the downstream API. Users can also view a sampling of fatal errors and warnings (e.g., non-fatal errors). Metric latency (the time between the actual state and the time that the state is visible to users) may be configured to be below a latency threshold (e.g., less than 10 seconds). Sampling refers to a first N errors and/or warnings of an arbitrary type.

Users can view an outcome of a load phase. When a load phase is complete (e.g., when all jobs have been either successfully executed or have failed permanently), users will see that state reflected in a "sync status" UI. It will appear as a completed sync along with information about the load phase results, including duration, a number of successful and failed loads, counts of status codes (e.g., non-2xx status codes) returned by the downstream API, and a sampling of errors and/or warnings.

In various embodiments, the data management system allows user data (e.g., query results, and error messages) to be retained for a period of time (e.g., no more than 14 days) to ensure compliance with various regulations. If users are able to view sync reports in a user interface beyond this retention period, there may or may not be an option for viewing error and warning messages or failed request/response payloads.

Personally identifiable information (PII) may be filtered out for users without PII permissions. When viewing query results, requests, responses, error messages, or other payloads that may contain user data, PII can be redacted for users who do not have PII permissions.

A loader (also referred to as a loader component) can be a subcomponent of a visual workflow service (e.g., AWS Step Function, Lambda). A loader can create jobs and update a sync report.

A visual workflow service can be triggered by a scheduler. An extract phase can be an entry point. The loader portion of the Step Function itself is substantially linear. The "Map State" step may take each file (e.g., S3 file) that the Prepare Load function returns and invoke the load function in series. Each step can have custom retry and error-handling policies.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
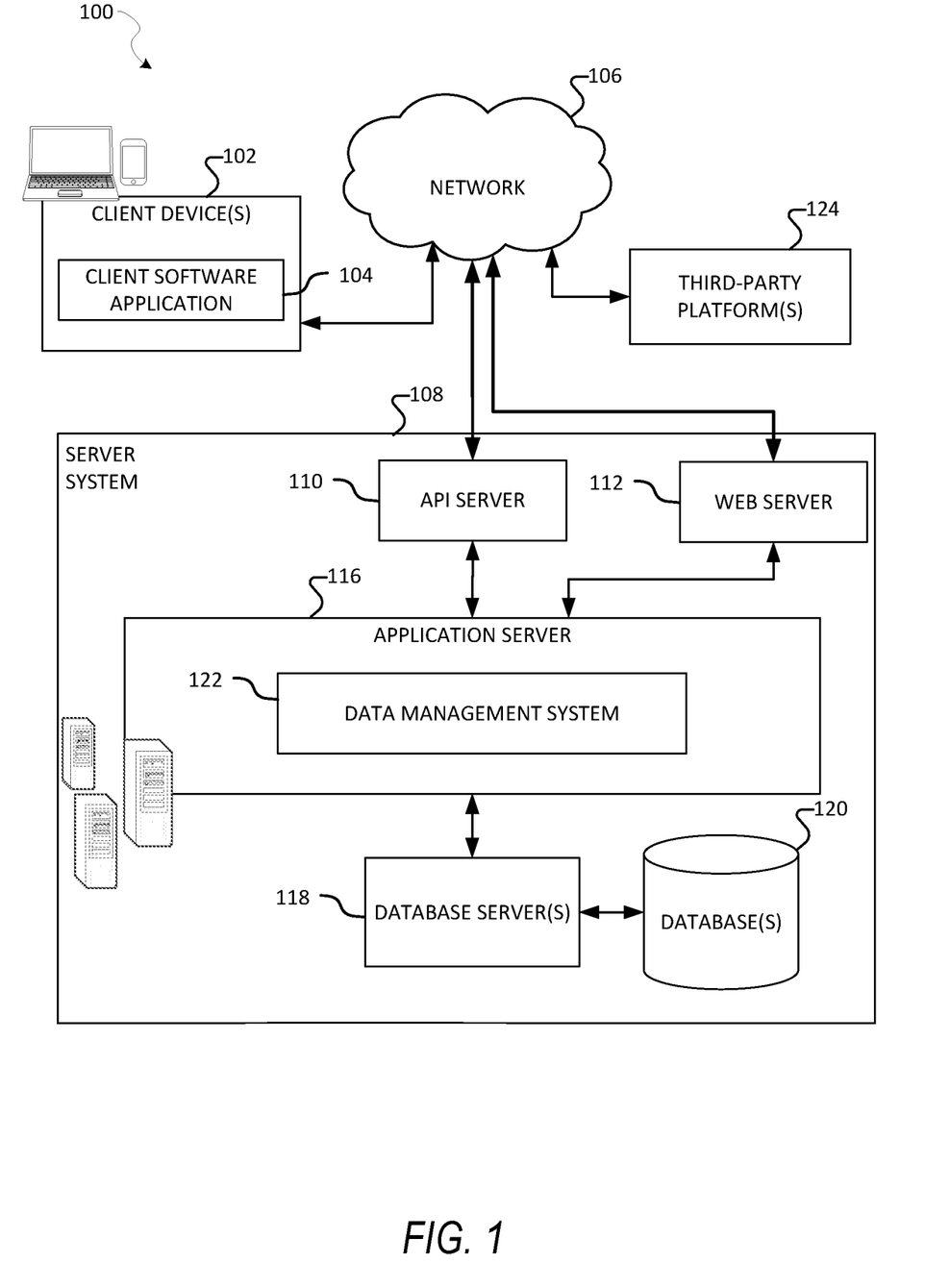
FIG. 1 is a block diagram showing an example networked environment that includes a data management system, according to various embodiments of the present disclosure.

FIG. 1 is a block diagram showing an example networked environment 100 that includes a data management system 122, according to various embodiments of the present disclosure. By including the data management system 122, the networked environment 100 can facilitate efficient data loading and and management in high throughput and multifaceted networked environment as described herein. As shown, the networked environment 100 includes one or more client devices 102, a server system 103, and a network 106 (e.g., including Internet, wide-area-network (WAN), local-area-network (LAN), wireless network, etc.) that are communicatively coupled together. Each client device 102 can host a number of applications, including a client software application 104. The client software application 104 can communicate data with the server system 103 via a network 106. Accordingly, the client software application 104 can communicate and exchange data with the server system 103 via the network 106.

The server system 103 provides server-side functionality via the network 106 to the client software application 104. While certain functions of the networked environment 100 are described herein as being performed by the data management system 122 on the server system 103, it will be appreciated that the location of certain functionality within the server system 103 is a design choice. For example, it may be technically preferable to initially deploy certain technology and functionality within the server system 103, but later migrate this technology and functionality to the client software application 104.

With respect to server system 103, each Application Program Interface (API) server 110 and web server 112 is coupled to an application server 116, which hosts the data management system 122. The application server 116 is communicatively coupled to a database server 113, which facilitates access to a database 120 that stores data associated with the application server 116, including data that may be generated or used by the data management system 122, in various embodiments.

The API server 110 receives and transmits data (e.g., API calls, commands, requests, responses, and authentication data) between the client device 102 and the application server 116, and between the one or more services and the application server 116. Specifically, the API server 110 provides a set of interfaces (e.g., endpoint, routines, or protocols) that can be called or queried by the client software application 104 or the one or more services in order to invoke the functionalities of the application server 116. The API server 110 exposes various functions supported by the application server 116, including without limitation: user registration; login functionality; data object operations (e.g., extraction, generating, storing, retrieving, encrypting, decrypting, transferring, access rights, licensing, etc.), and user communications.

Through one or more web-based interfaces (e.g., web-based user interfaces), the web server 112 can support various functions of the data management system 122 of the application server 116. In various embodiments, the deployment or implementation of the web server 112 and the application server 116 may share the same set of executable code. In various embodiments, the web server 112 may be a subsystem or a component of the application server 116.

The application server 116 hosts a number of applications and subsystems, including the data management system 122, which supports various functions and services with respect to various embodiments described herein. The application server 116 is communicatively coupled to a database server 113, which facilitates access to database(s) 120 that stores data associated with the data management system 122.

Figure 2:
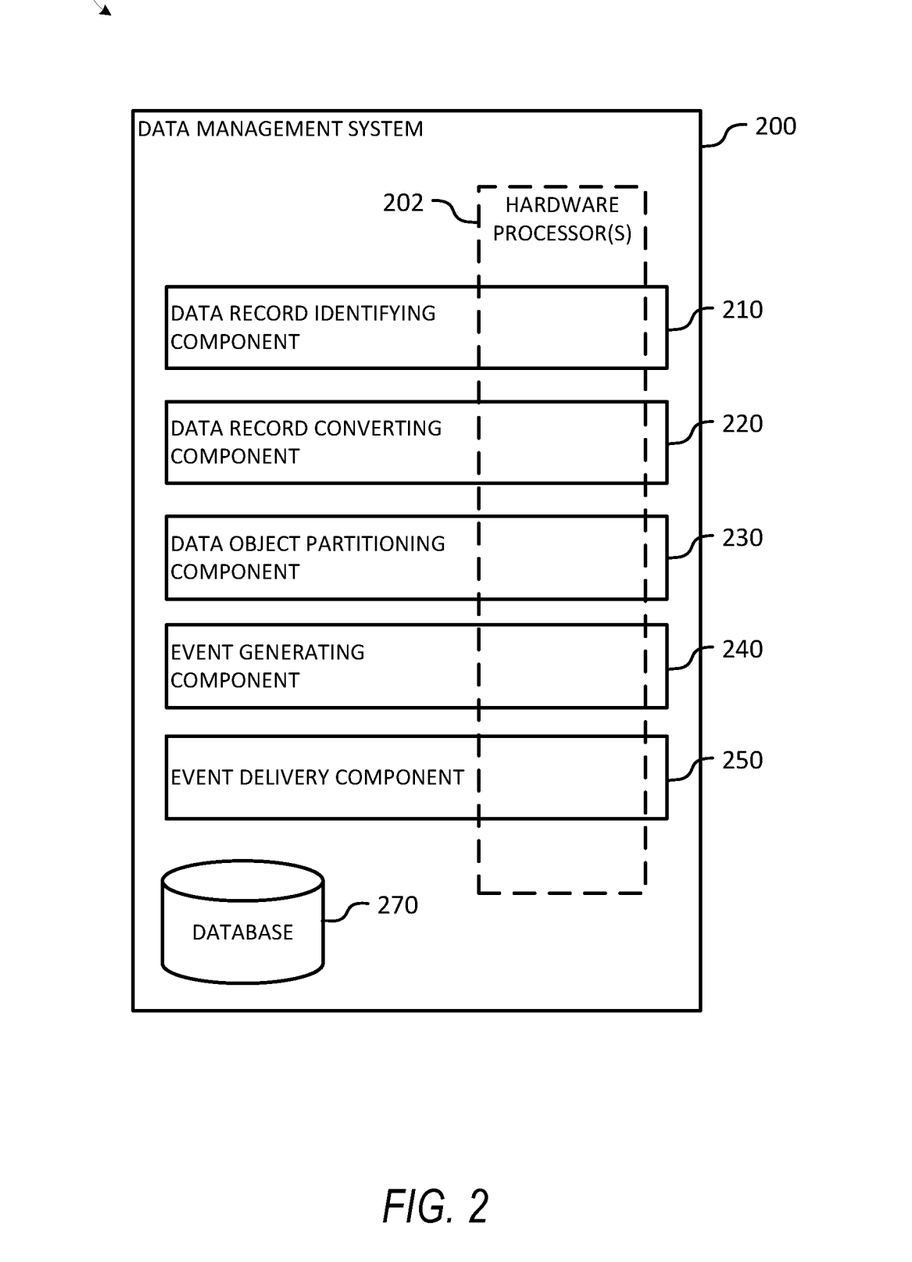
FIG. 2 is a block diagram illustrating an example data management system, according to various embodiments of the present disclosure.

FIG. 2 is a block diagram illustrating an example data management system 200, according to various embodiments of the present disclosure. For some embodiments, the data management system 200 represents an example of the data management system 122 described with respect to FIG. 1. As shown, the data management system 200 comprises a data record identifying component 210, a data record converting component 220, a data object partitioning component 230, an event generating component 240, and an event delivery component 250. According to various embodiments, one or more of the data record identifying component 210, the data record converting component 220, the data object partitioning component 230, the event generating component 240, and the event delivery component 250 are implemented by one or more hardware processors 202.

In various embodiments, the data record identifying component 210 is configured to identify a data record from a database, such as object-based storage. A data record may include one or more query results that are extracted from one or more data warehouses. In various embodiments, the one or more data warehouses may be hosted in customers' computing systems or environments.

In various embodiments, the data record converting component 220 is configured to convert the data record into a data object, such as JavaScript Object Notation (JSON) data object. A data object (e.g., a JSON object or JSON structure) can include a plurality of fields. Each field can include a result state.

In various embodiments, the data object partitioning component 230 is configured to partition a data object into one or more files. Each file can correspond to a row in the data record.

In various embodiments, the event generating component 240 is configured to generate one or more events (also referred to as jobs) based on the one or more files. In various embodiments, the event generating component 240 is configured to generate a pair (also referred to as source/destination pair or destination pair) based on an action and the one or more events.

In various embodiments, the event delivery component 250 is configured to cause the one or more events to be transmitted (or delivered) to one or more destinations, based on destination pairs described herein, for example. In various embodiments, the event delivery component 250 is configured to cause the one or more events to be transmitted (or delivered) to one or more destinations in series, or in parallel.

Figure 3:
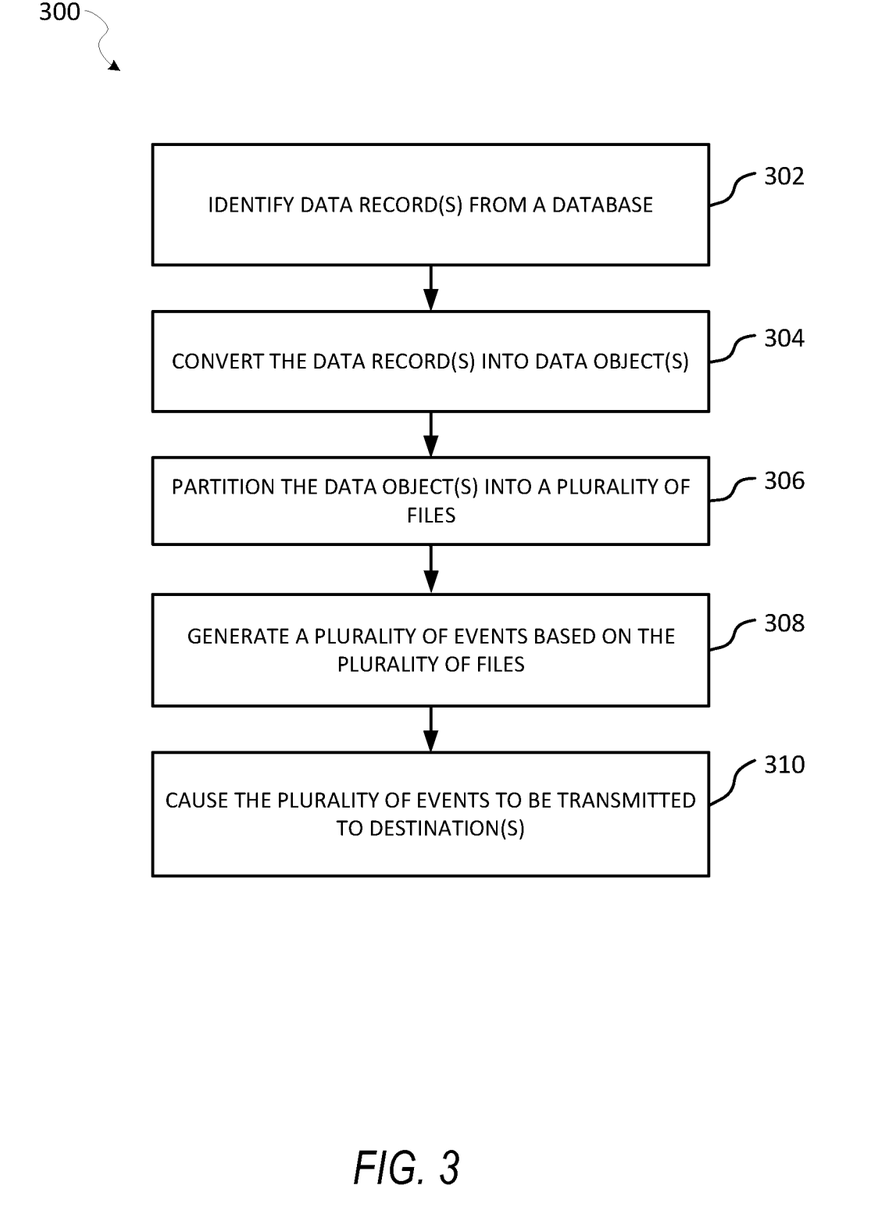
FIG. 3 is a flowchart illustrating an example method for managing data loading, according to various embodiments of the present disclosure.

FIG. 3 is a flowchart illustrating an example method for managing data loading, according to various embodiments of the present disclosure. It will be understood that example methods described herein may be performed by a machine in accordance with some embodiments. For example, the method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor identifies one or more data records from a database, such as object-based storage. A data record may include one or more query results that are extracted from one or more data warehouses. In various embodiments, the one or more data warehouses may be hosted in customers' computing systems or environments.

At operation 304, a processor converts the one or more data records into one or more data objects, such as JavaScript Object Notation (JSON) data objects. A data object (e.g., a JSON object or JSON structure) can include a plurality of fields. Each field can include a result state.

At operation 306, a processor partitions a data object into one or more files. Each file can correspond to a row in the data record.

At operation 308, a processor generates one or more events (also referred to as jobs) based on the one or more files.

At operation 310, a processor causes the one or more events to be transmitted (or delivered) to one or more configured destinations.

In various embodiments, a data record represents a result of execution of a Structured Query Language (SQL) query against a database from a customer's data warehouse, for example.

Figure 4:
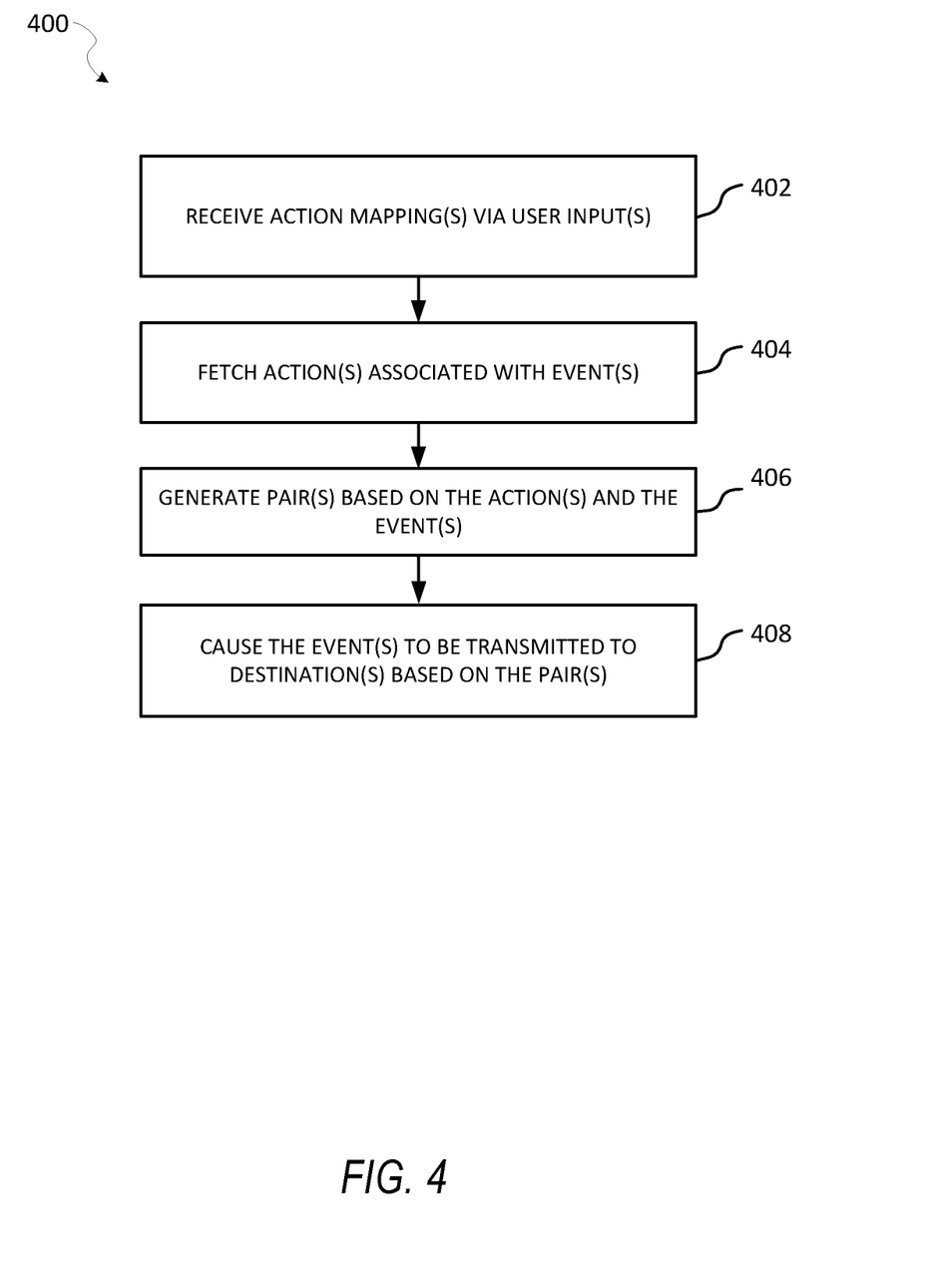
FIG. 4 is a flowchart illustrating an example method for managing data loading, according to various embodiments of the present disclosure.

FIG. 4 is a flowchart illustrating an example method for managing data loading, according to various embodiments of the present disclosure. It will be understood that example methods described herein may be performed by a machine in accordance with some embodiments. For example, the method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of method 400 may be a sub-routine of one or more of the operations of method 300. In various embodiments, one or more operations in method 400 may be performed subsequent to the operations of method 300.

At operation 402, a processor receives an action mapping via one or more user inputs.

At operation 404, a processor fetches one or more actions associated with the plurality of events. An action represents a destination.

At operation 406, a processor generates a pair (e.g., destination pair) based on the action and the plurality of events.

At operation 408, a processor causes the plurality of events to be transmitted (or delivered) to a destination based on the pair. In various embodiments, an event can be delivered at least once and can be retried a number of times or a period of time upon failure.

Figure 5:
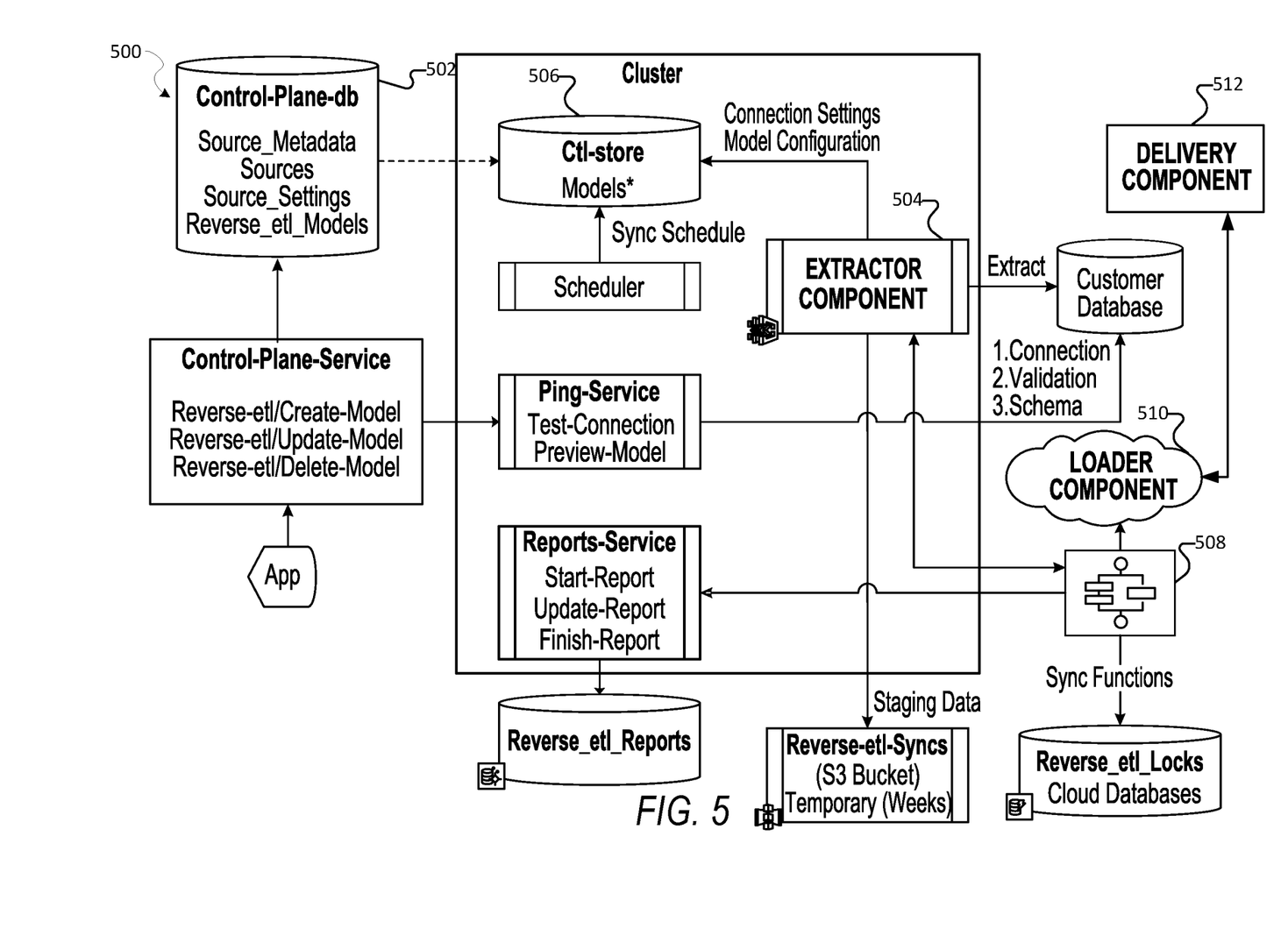
FIG. 5 is a block diagram illustrating an example networked computing architecture that includes an example data management system, according to various embodiments of the present disclosure.

FIG. 5 is a block diagram illustrating an example networked computing architecture 500 that includes an example data management system, according to various embodiments of the present disclosure. The example networked computing architecture 500 includes the data management system 122 described with respect to FIG. 1, the data management system 200 described with respect to FIG. 2, or individual components thereof. As illustrated, the example networked computing architecture 500 may be a cloud computing environment that hosts the data management system (e.g., system 122, system 200) to perform various functionality described herein. As shown, control plane databases 502 may store user input data, such as metadata, action configurations, action mappings, etc., via a control plane, as described herein. Loader component 510 may include one or more components of the data management system (e.g., system 122, system 200) to perform various operations described herein.

In various embodiments, the loader component 510 can receive (or access) data records (e.g., query results) generated by extractor component 504. The loader component 510 can generate events (or jobs) for the delivery component 512 and cause the delivery component 514 to deliver the events to various configured destinations (not shown). A load phase may not be considered successful until the loader component 510 causes the successful delivery of the events. In a load phase, events may be retried a number of times or a period of time upon failure, as described herein.

Figure 6:
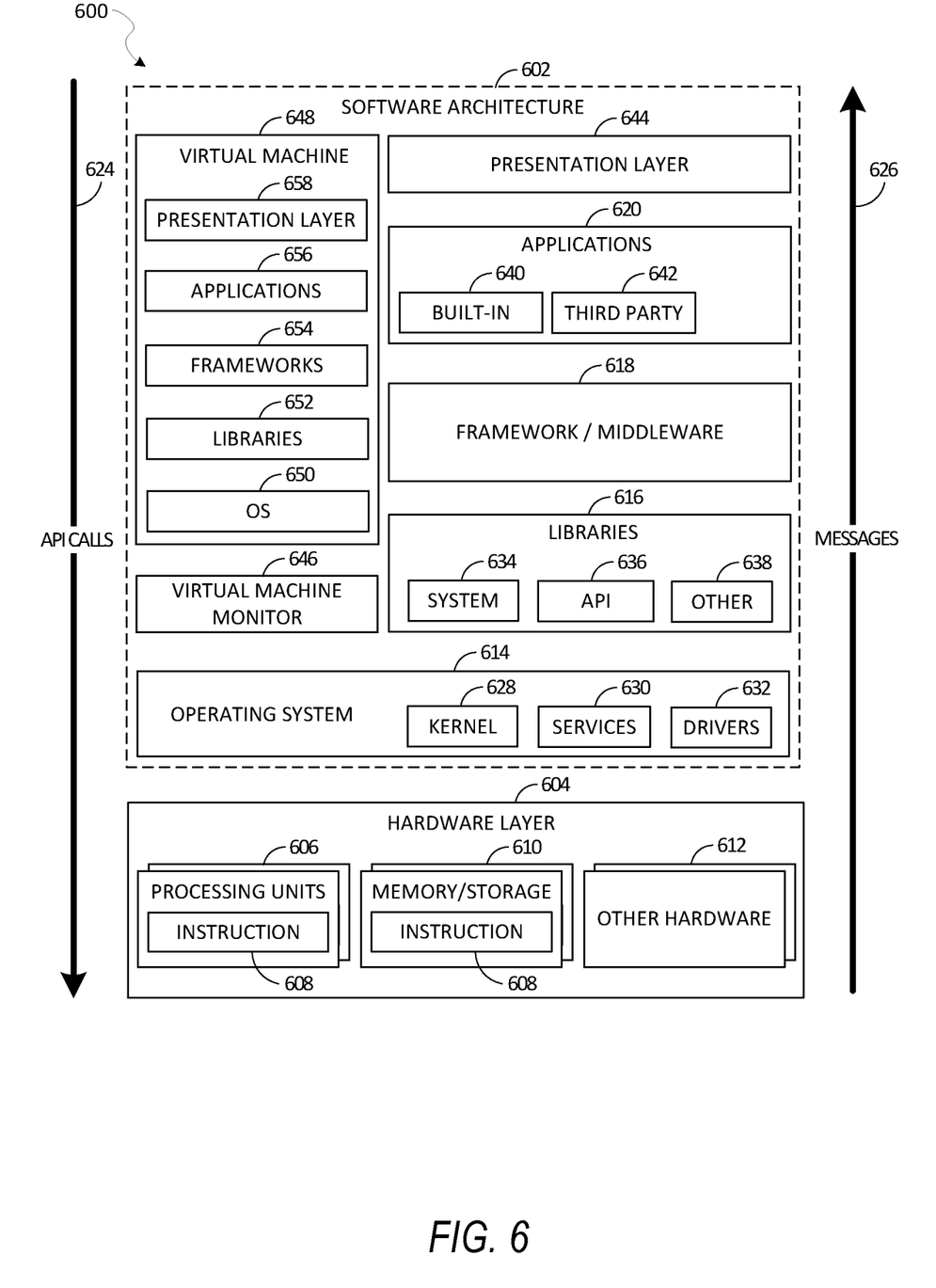
FIG. 6 is a block diagram illustrating a representative software architecture, which may be used in conjunction with various hardware architectures herein described, according to various embodiments of the present disclosure.

FIG. 6 is a block diagram illustrating an example of a software architecture 602 that may be installed on a machine, according to some example embodiments. FIG. 6 is merely a non-limiting example of software architecture, and it will be appreciated that many other architectures may be implemented to facilitate the functionality described herein. The software architecture 602 may be executing on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 comprises one or more processing units 606 having associated executable instructions 603. The executable instructions 603 represent the executable instructions of the software architecture 602. The hardware layer 604 also includes memory or storage modules 610, which also have the executable instructions 603. The hardware layer 604 may also comprise other hardware 612, which represents any other hardware of the hardware layer 604, such as the other hardware illustrated as part of the machine 600.

In the example architecture of FIG. 6, the software architecture 602 may be conceptualized as a stack of layers, where each layer provides particular functionality. For example, the software architecture 602 may include layers such as an operating system 614, libraries 616, frameworks/middleware 613, applications 620, and a presentation layer 644. Operationally, the applications 620 or other components within the layers may invoke API calls 624 through the software stack and receive a response, returned values, and so forth (illustrated as messages 626) in response to the API calls 624. The layers illustrated are representative in nature, and not all software architectures have all layers. For example, some mobile or special-purpose operating systems may not provide a frameworks/middleware 613 layer, while others may provide such a layer. Other software architectures may include additional or different layers.

The operating system 614 may manage hardware resources and provide common services. The operating system 614 may include, for example, a kernel 623, services 630, and drivers 632. The kernel 623 may act as an abstraction layer between the hardware and the other software layers. For example, the kernel 623 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than by interfacing directly with the underlying operating system 614 functionality (e.g., kernel 623, services 630, or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 633 to provide many other APIs to the applications 620 and other software components/modules.

The frameworks 613 (also sometimes referred to as middleware) may provide a higher-level common infrastructure that may be utilized by the applications 620 or other software components/modules. For example, the frameworks 613 may provide various graphical user interface functions, high-level resource management, high-level location services, and so forth. The frameworks 613 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a home application, a contacts application, a browser application, a book reader application, a location application, a media application, a messaging application, or a game application.

The third-party applications 642 may include any of the built-in applications 640, as well as a broad assortment of other applications. In a specific example, the third-party applications 642 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 642 may invoke the API calls 624 provided by the mobile operating system such as the operating system 614 to facilitate functionality described herein.

The applications 620 may utilize built-in operating system functions (e.g., kernel 623, services 630, or drivers 632), libraries (e.g., system libraries 634, API libraries 636, and other libraries 633), or frameworks/middleware 613 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with the user.

Some software architectures utilize virtual machines. In the example of FIG. 6, this is illustrated by a virtual machine 643. The virtual machine 643 creates a software environment where applications/modules can execute as if they were executing on a hardware machine (e.g., the machine 400 of FIG. 4). The virtual machine 643 is hosted by a host operating system (e.g., the operating system 614) and typically, although not always, has a virtual machine monitor 646, which manages the operation of the virtual machine 643 as well as the interface with the host operating system (e.g., the operating system 614). A software architecture executes within the virtual machine 643, such as an operating system 650, libraries 652, frameworks/middleware 654, applications 656, or a presentation layer 653. These layers of software architecture executing within the virtual machine 643 can be the same as corresponding layers previously described or may be different.

Figure 7:
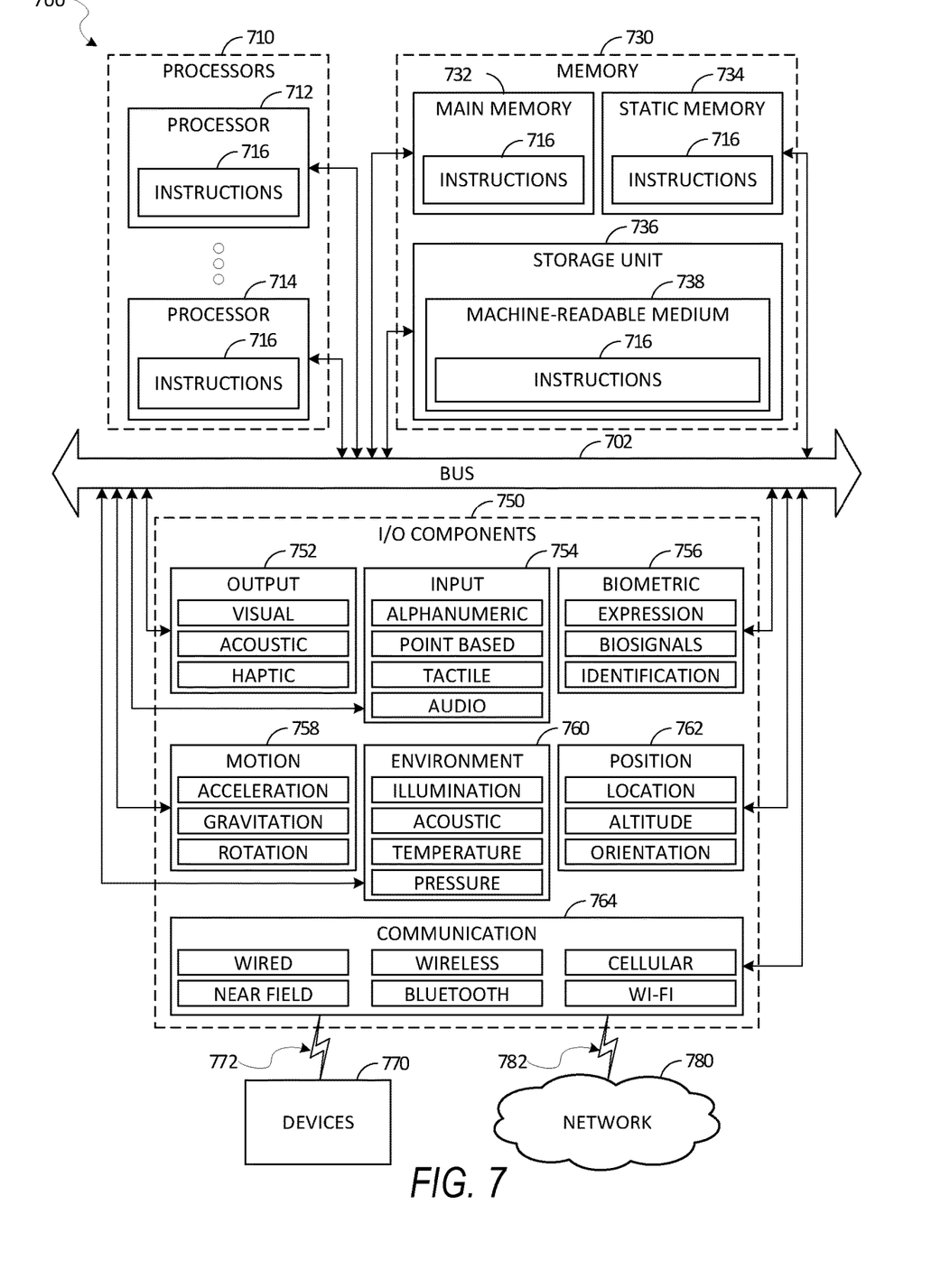
FIG. 7 is a block diagram illustrating components of a machine able to read instructions from a machine storage medium and perform any one or more of the methodologies discussed herein according to various embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 300 described above with respect to FIG. 3, and the method 700 described above with respect to FIG. 7. Instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an embodiment, the processors 710 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 may include a main memory 732, a static memory 734, and a storage unit 736 including machine-readable medium 733, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 750 may include biometric components 756, motion components 753, environmental components 760, or position components 762, among a wide array of other components. The motion components 753 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 730 or devices 770 via a coupling 732 and a coupling 772, respectively. For example, the communication components 764 may include a network interface component or another suitable device to interface with the network 730. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 730, 732, 734, and/or the memory of the processor(s) 710) and/or the storage unit 736 may store one or more sets of instructions 716 and data structures (e.g., software) embodying or utilized by any one or more of the methodologies or functions described herein.

These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 730 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 730 or a portion of the network 730 may include a wireless or cellular network, and the coupling 732 may be a Code Division Multiple Access (CDMA) connection, a Global System for Mobile communications (GSM) connection, or another type of cellular or wireless coupling. In this example, the coupling 732 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

identifying a data record from a database;

converting the data record into a data object;

partitioning the data object into a plurality of files, each file corresponding to a row in the data record;

generating a plurality of events based on the plurality of files;

receiving an action mapping via one or more user inputs;

fetching an action associated with the plurality of events based on the action mapping, the action corresponding to a destination;

generating a pair based on the action and the plurality of events; and causing the plurality of events to be transmitted to the destination based on the pair.

2. The method of claim 1, wherein the data record represents a result of execution of a query against a database.

3. The method of claim 2, wherein the query is a Structured Query Language (SQL) query, and wherein the data object is a JavaScript Object Notation (JSON) data object.

4. The method of claim 1, further comprising:
generating a load progress based on a delivery status of the plurality of events; and
causing display of the load progress on a device.

5. The method of claim 4, wherein the load progress comprises one of a pending status, a successful status, and a failed status, and further comprises a count of errors or warnings returned by a downstream Application Programming Interface (API).

6. The method of claim 1, further comprising:
identifying metadata associated with the data record, the metadata indicating one or more changes associated with the data record; and
creating the event further based on the metadata associated with the data record.

7. The method of claim 1, wherein the event is a first event, and wherein the data object is a first data object, further comprising:
creating a second event based on a second data object; and
causing the first event and the second event to be transmitted to the destination in parallel.

8. The method of claim 1, wherein the data object comprises a plurality of fields, each field comprises a result state.

9. The method of claim 1, wherein the database is an object-based storage.

10. A system comprising:
at least one memory storing instructions; and
one or more hardware processors communicatively coupled to the at least one memory and configured by the instructions to perform operations comprising:
identifying a data record from a database;
converting the data record into a data object;
partitioning the data object into a plurality of files, each file corresponding to a row in the data record;
generating a plurality of events based on the plurality of files;
receiving an action mapping via one or more user inputs;
fetching an action associated with the plurality of events based on the action mapping, the action corresponding to a destination;
generating a pair based on the action and the plurality of events; and
causing the plurality of events to be transmitted to the destination based on the pair.

11. The system of claim 10, wherein the data record represents a result of execution of a query against a database.

12. The system of claim 11, wherein the query is a Structured Query Language (SQL) query, and wherein the data object is a JavaScript Object Notation (JSON) data object.

13. The system of claim 10, wherein the operations further comprise:
generating a load progress based on a delivery status of the plurality of events; and
causing display of the load progress on a device.

14. The system of claim 13, wherein the load progress comprises one of a pending status, a successful status, and a failed status, and further comprises a count of errors or warnings returned by a downstream Application Programming Interface (API).

15. The system of claim 10, wherein the operations further comprise:
identifying metadata associated with the data record, the metadata indicating one or more changes associated with the data record; and
creating the event further based on the metadata associated with the data record.

16. The system of claim 10, wherein the event is a first event, and wherein the data object is a first data object, further comprising:
creating a second event based on a second data object; and
causing the first event and the second event to be transmitted to the destination in parallel.

17. The system of claim 10, wherein the data object comprises a plurality of fields, each field comprises a result state.

18. A non-transitory computer-readable medium comprising instructions that, when executed by a hardware processor of a device, cause the device to perform operations comprising:
identifying a data record from a database;
converting the data record into a data object;
partitioning the data object into a plurality of files, each file corresponding to a row in the data record;
generating a plurality of events based on the plurality of files;
receiving an action mapping via one or more user inputs;
fetching an action associated with the plurality of events based on the action mapping, the action corresponding to a destination;
generating a pair based on the action and plurality of events; and
causing the plurality of events to be transmitted to the destination based on the pair.

* * * * *

UNITED STATES PATENT AND TRADEMARK OFFICE
CERTIFICATE OF CORRECTION

| | | |
|---|---|---|
| PATENT NO. | : 12,288,108 B2 | Page 1 of 1 |
| APPLICATION NO. | : 18/195773 | |
| DATED | : April 29, 2025 | |
| INVENTOR(S) | : Tyson Winfield Mote | |

It is certified that error appears in the above-identified patent and that said Letters Patent is hereby corrected as shown below:

In the Claims

In Column 18, Line 47, in Claim 18, after "and", insert --the--

Signed and Sealed this
Twenty-seventh Day of January, 2026

John A. Squires
*Director of the United States Patent and Trademark Office*